US008214338B1

(12) United States Patent
Kirchhoff et al.

(10) Patent No.: US 8,214,338 B1
(45) Date of Patent: Jul. 3, 2012

(54) METHODS AND SYSTEMS FOR MEDIA STORAGE

(75) Inventors: Leland W. Kirchhoff, Santa Barbara, CA (US); David S. Trandal, Santa Barbara, CA (US); David F. Hofstatter, Santa Barbara, CA (US)

(73) Assignee: Callwave, Inc., San Francisco, CA (US)

( * ) Notice: Subject to any disclaimer, the term of this patent is extended or adjusted under 35 U.S.C. 154(b) by 614 days.

(21) Appl. No.: 12/113,733

(22) Filed: May 1, 2008

Related U.S. Application Data

(60) Provisional application No. 60/915,322, filed on May 1, 2007.

(51) Int. Cl.
*G06F 7/00* (2006.01)
*G06F 17/00* (2006.01)
(52) U.S. Cl. ............................ 707/693; 379/67.1
(58) Field of Classification Search ............ 707/693, 707/769
See application file for complete search history.

(56) References Cited

U.S. PATENT DOCUMENTS

| | | | |
|---|---|---|---|
| 5,533,106 A | 7/1996 | Blumhardt | |
| 5,651,054 A | 7/1997 | Dunn et al. | |
| 5,729,741 A * | 3/1998 | Liaguno et al. | 1/1 |
| 5,845,279 A * | 12/1998 | Garofalakis et al. | 1/1 |
| 6,175,622 B1 | 1/2001 | Chiniwala et al. | |
| 6,333,973 B1 | 12/2001 | Smith et al. | |
| 6,353,660 B1 | 3/2002 | Burger et al. | |
| 6,356,662 B1 * | 3/2002 | Tsai | 382/234 |
| 6,411,692 B1 | 6/2002 | Scherer | |
| 6,658,100 B1 | 12/2003 | Lund | |
| 6,661,785 B1 | 12/2003 | Zhang et al. | |
| 6,687,340 B1 | 2/2004 | Goldberg et al. | |
| 6,775,651 B1 * | 8/2004 | Lewis et al. | 704/235 |
| 7,058,573 B1 | 6/2006 | Murveit et al. | |

(Continued)

FOREIGN PATENT DOCUMENTS

EP 1 120 954 8/2001

(Continued)

OTHER PUBLICATIONS

Grenville, Mike (2006) "News: Mobile wins startup awards, 82ASK and Spinvox have both won Start Up Awards," *160Characters SMS & Mobile Messaging Association*.

(Continued)

*Primary Examiner* — Kuen Lu
*Assistant Examiner* — Susan F Rayyan
(74) *Attorney, Agent, or Firm* — Knobbe, Martens, Olson & Bear LLP

(57) ABSTRACT

Described herein are methods and systems related to managing the storage of telephony-related data, such as calls, contacts, and/or messages. An illustrative embodiment receives media via a telephonic device. The media is stored in a first data store with a first degree of compression as a first file of a first size. A search interface is provided via which a user can search for the media. After a first period of time and/or at least partly in response to determining that the media has not been accessed or has been infrequently accessed, the media is stored in a second data store with a second degree of compression as a second file of a second size, wherein the second degree of compression is higher than the first degree of compression, and wherein the second size is smaller than the first size.

30 Claims, 7 Drawing Sheets

U.S. PATENT DOCUMENTS

| | | | |
|---|---|---|---|
| 7,065,186 B1 | 6/2006 | Myers et al. | |
| 7,085,716 B1 | 8/2006 | Even et al. | |
| 7,103,154 B1* | 9/2006 | Cannon et al. | 379/67.1 |
| 7,170,978 B2 | 1/2007 | Idren | |
| 7,191,135 B2 | 3/2007 | O'Hagan | |
| 7,206,389 B1 | 4/2007 | Dumoulin et al. | |
| 7,209,964 B2 | 4/2007 | Dugan et al. | |
| 7,302,539 B2* | 11/2007 | Korgaonkar et al. | 711/162 |
| 7,310,601 B2 | 12/2007 | Nishizaki et al. | |
| 7,316,354 B2 | 1/2008 | Davis | |
| 7,319,742 B2 | 1/2008 | Levine | |
| 7,324,939 B1 | 1/2008 | Cardillo et al. | |
| 7,324,940 B1 | 1/2008 | Miller et al. | |
| 7,324,943 B2 | 1/2008 | Rigazio et al. | |
| 7,327,696 B1 | 2/2008 | Yarlagadda | |
| 7,327,723 B2* | 2/2008 | Kurganov | 370/352 |
| 7,369,653 B2* | 5/2008 | Dezonno et al. | 379/265.02 |
| 7,388,949 B2 | 6/2008 | Contractor et al. | |
| 7,412,050 B2 | 8/2008 | Renner et al. | |
| 7,647,350 B2* | 1/2010 | Parkinson et al. | 707/693 |
| 7,773,954 B2* | 8/2010 | Jun | 455/76 |
| 2003/0016792 A1* | 1/2003 | Skladman et al. | 379/88.12 |
| 2003/0026393 A1* | 2/2003 | Skladman et al. | 379/88.13 |
| 2003/0063731 A1 | 4/2003 | Woodring | |
| 2003/0123629 A1 | 7/2003 | Hussain et al. | |
| 2004/0105536 A1 | 6/2004 | Williams | |
| 2004/0240641 A1 | 12/2004 | Cohen et al. | |
| 2005/0171936 A1 | 8/2005 | Zhu | |
| 2005/0265322 A1 | 12/2005 | Hester | |
| 2006/0045255 A1* | 3/2006 | Peters et al. | 379/265.09 |
| 2006/0058052 A1* | 3/2006 | Plestid et al. | 455/519 |
| 2007/0126875 A1* | 6/2007 | Miyamaki | 348/207.11 |
| 2007/0127657 A1* | 6/2007 | Shaffer et al. | 379/142.1 |
| 2007/0183405 A1* | 8/2007 | Bennett | 370/352 |
| 2008/0109422 A1* | 5/2008 | Dedhia | 707/5 |
| 2008/0178225 A1* | 7/2008 | Jost | 725/58 |
| 2008/0229048 A1* | 9/2008 | Murase et al. | 711/171 |
| 2009/0067586 A1* | 3/2009 | Fano et al. | 379/49 |

FOREIGN PATENT DOCUMENTS

WO     WO 01/76210     10/2001

OTHER PUBLICATIONS

Holahan, Catherine (2007) "The twitterization of blogs," *Business Week*.

La Monica, Paul R. (2007) "Leave your blog after the beep," CNNMoney.com, *Media Biz*.

Lee, Maggie (2006) "Not all talk: A strong coffee with the founders of speech-to-text telecom *Spinvox*," *European Business*.

Shannon, Victoria (2007) "The End User: A voice for the consumer, Speaking up to get online," *International Herald Tribune*, Web Site: http://www.iht.com.

Wides, Cara, "A new spin on messaging," *Spotlight*.

(2006) "Entrepreneur of the Year awards—benchmark to the global economy," *The Business Magazine (Thames Valley)*, Web Site: http://www.eoy.co.uk.

(2007) "Leave your text message after the beep . . . ," FT.com *Financial Times*.

Office Action from U.S. Appl. No. 11/971,097, mailed Mar. 29, 2011 in 20 pages.

U.S. Appl. No. 11/971,097, filed Jan. 8, 2008, Kirchhof et al.

* cited by examiner

METHODS AND SYSTEMS FOR MEDIA STORAGE

CROSS-REFERENCE TO RELATED APPLICATIONS

The present application claims priority from U.S. Patent Application No. 60/915,322, filed May 1, 2007, the content of which is incorporated herein in their entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention is related to telecommunications, and in particular, to methods and systems for retaining calls, contacts, and messages.

2. Description of the Related Art

There is a wealth of information exchanged when people use their phones. On conventional systems only a very limited part of this information is captured, in the form of messages, typically only briefly retained while the information is of immediate use, and then such information is discarded. In conventional systems, it is often to technically not feasible or too costly to retain such information for an extended period of time.

SUMMARY OF THE INVENTION

Embodiments for efficiently storing data are described herein. Certain embodiments selectively store telephony related data in a relatively higher quality version or a relatively lower quality version based on one or more criteria, such as the age of the data, the data type, etc. The telephony related data can include some or all of the following: audio messages, faxes, demo messages, greetings, text messages, emails, videos, and/or other media. Certain embodiments store telephony data in a first data store or in a second data stored at least partly based on certain criteria. Certain embodiments include a search interface which enables a user to search for telephony data.

An example embodiment provides a method of processing media received over a communications network, the method comprising: receiving media via a telephonic device; storing the media in a first data store with a first degree of compression as a first file of a first size; enabling a user to search for the media; after a first period of time and/or at least partly in response to determining that the media has not been accessed or has been infrequently accessed, storing the media in a second data store with a second degree of compression as a second file of a second size, wherein the second degree of compression is higher than the first degree of compression, and wherein the second size is smaller than the first size.

An example embodiment provides a media processing system, comprising: a first communication network interface configured to receive communications via a communications network; a first data store; a second data store; program code stored in a computer readable medium configured to: receive media via a telephonic device; store the media in the first data store with a first degree of compression as a first file of a first size; after a first period of time and/or at least partly in response to an indication that the media has not been accessed or has been infrequently accessed, store the media in the second data store with a second degree of compression as a second file of a second size, wherein the second degree of compression is higher than the first degree of compression, and wherein the second size is smaller than the first size.

An example embodiment provides a method of processing media received over a communications network, the method comprising: receiving media over a network; storing the media in a first data store with a first degree of compression as a first file of a first size; after a first period of time and/or at least partly in response to determining that the media has not been accessed or has been accessed at less than a first rate, automatically storing the media in a second data store with a second degree of compression as a second file of a second size, wherein the second degree of compression is higher than the first degree of compression, and wherein the second size is smaller than the first size.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

DETAILED DESCRIPTION OF PREFERRED EMBODIMENTS

Figure 1:
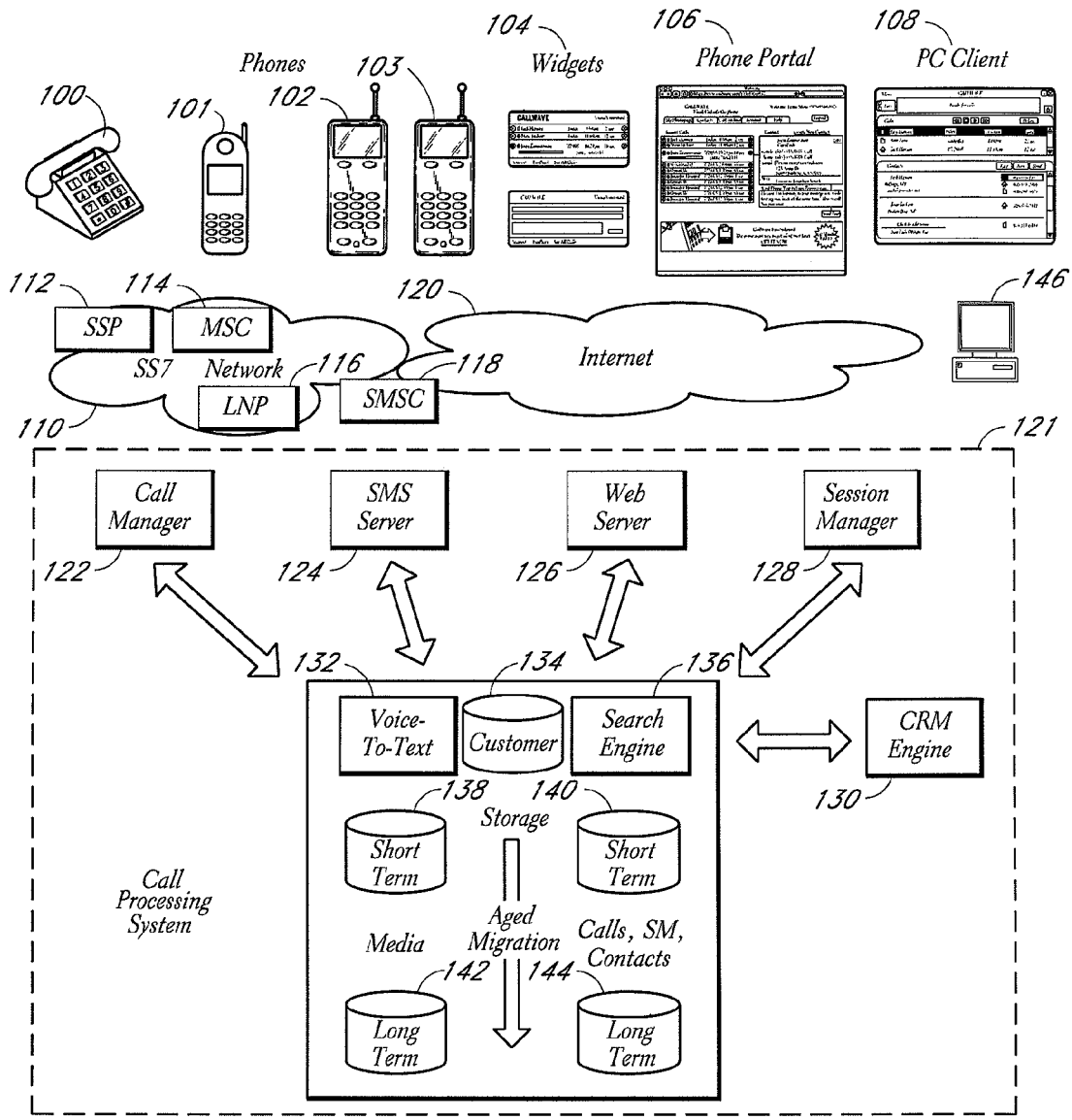
FIG. 1 illustrates an example network operating environment for advanced telecommunications services.

The present invention is related to telecommunications, and in particular, to methods and systems for retaining calls, messages, and other objects.

As noted above, there is a wealth of information exchanged when people use their phones. This trail of information often has long term value to the individual if it can be retained, organized, and made easily searchable. The information trail in effect expands a user's personal, searchable memory. With the cost of storage today it is reasonable to keep this information indefinitely or for an extended period of time.

Embodiments of the present invention provide methods and systems to enable a service provider to offer services that allow subscribers to store a collection of objects (e.g., calls and messages) for an extended period of time. These objects of interest to the subscriber are optionally accumulated as calls occur and messages are exchanged.

Retaining and organizing calls and messages improves subscriber's overall communication experience, increasing the attractiveness and value to the subscriber of the service provider's telecommunications service offering. Further, because this secure personalized information is not available to another unauthorized service provider, this could become a subscriber retention tool for a service provider as the subscriber would not want to lose access to the personalized information. In an example embodiment, a security and information usage policy associated with the system is clearly communicated to the user at the outset to establish trust.

Certain embodiments of the extended storage system have some or all of the following characteristics:

- The storage system optionally stores media (all or selected portions of the customer's audio messages, faxes, demo messages, greetings, text messages, emails, videos, etc.) for a customer for as long as the customer has an account in the database, as long as the media is referenced by the database, and/or until a certain time period or date has been reached (e.g., specified by the customer and/or a system operator).
- Customer media is optionally stored redundantly. By way of illustration and not limitation, copies may be stored on a certain number of data storage devices (e.g., 3 hard disk drives, solid state drives, or optical drives, optionally housed separately) at separated sites (e.g., 2 different sites located in geographic regions remote from each other, such as in different cities, states, or countries) to provide individual machine and geographic site diversity. The media archiving is optionally performed at the application level rather than relying on more expensive (and in some cases less reliable) lower level operating system and/or hardware-based level.
- The system is optionally tolerant of network outages, system failure, drive failures or site failures for example (e.g., by using power backup systems, load balancing, RAID drives, redundant networks and redundant network connections, etc.).
- The system stores media (e.g., audio, video, and/or photo/image media) in a compressed format in nonvolatile memory, optionally for relatively extended periods of time (e.g., months or years). The system optionally maintains a high fidelity copy of audio, photo, image, and/or video media files for a relatively short period of time (e.g., days, weeks, or a few months). The high fidelity copy is optionally not stored as reliably as the compressed format (e.g., copies of the high fidelity version are stored on fewer devices and/or in fewer geographical areas, such as only 1 one device in 1 area). As the messages, other encoding methods requiring less storage space can optionally be applied to the media files at specified times (e.g., after a week, a month, a year, or other specified time period).
- If a request is made for a media file in a encoding that is different that the encoding the media is stored in, the system transcodes the media to the new encoding (e.g., wherein the media is converted from a first format intended to be used with a first codec to a second format intended to be used with a second codec, optionally by decoding/decompressing the original data to a raw intermediate format, in a way that mimics standard playback of the (in certain cases) lossy content, and then re-encoding this into the target format). A high fidelity copy, if available, is optionally used to transcode the media.
- The system optionally periodically checks the integrity of the archive (e.g., by checking CRC codes, checksums, or other codes versus that media data). This check will optionally remove media that is no longer in use (e.g., that has not been accessed for a specified period of time by a user), optionally repairs redundancy by identifying files that are not properly distributed, and optionally reacts to storage configuration changes.
- The system optionally utilizes inexpensive, off-the-shelf disk storage. The application level redundancy reduces the need for expensive disk storage systems. High performance input/output of individual disks can be obviated given that the media is available from multiple locations.
- The system optionally has relatively reduced power consumption (e.g., by spinning down or taking off line certain storage devices). The operational cost to power the Extended Storage system could, in certain situations, be the most expensive cost factor in a service provider deployment. The system enables the spin down (to reduce power consumption and/or wear) of disks (e.g., magnetic or optical) with stored media older then an operator configurable time period (e.g., one year). Disks can spin up if a read operation is requested.
- Optionally, the requesting application/program is informed that a spin up operation is being performed. Optionally, the requestor knows that the request is to a spun down disk based on other indications (e.g., if the subscriber requests media of at a specified date, and the system stores data of that date on a disk that is typically spun down). Optionally, at least partly in response to determining that data requested by a subscriber is stored on a spun down disk, a notification is provided to the subscriber (e.g., via the user interface via which the subscriber submitted the request) that their request is being processed and there may be a short delay.
- The system supports remote deployments at customer premises. The system is optionally configured so that all media (or selected portions thereof) being stored by the system for a customer is stored at the customer site and all access to the media stays within the customer site.

Certain embodiments of the call processing system 121 described in the application provide call and message services using condition monitors/triggers, such as SS7 Advanced Intelligent Network (AIN) triggers. In an example embodiment, to support this service, the service provider configures a trigger at the appropriate points in an inbound and/or outbound call for a customer/subscriber. In an example embodiment, when a certain trigger fires, a call processing system (e.g., acting as a Service Control Point (SCP) in the SS7 network, and connecting calls from one phone line to another, using, for example, software running on a computer system), receives a query that enables the call processing system 121 to control, at least in part, the call and optionally control the visual presentation of the call (or message) to the caller, and/or the called party.

In an example embodiment, enhanced call management and call routing services are provided via Common Channel Signaling (CCS) or Common Channel Interoffice Signaling (CCIS) information, such as, by way of example, via SS7 Intelligent Network (IN) triggers in the switches of local exchange telephone companies. For example, SS7 AIN triggers are set in the switches of carriers, such as Carrier Partners (e.g., carriers who are partners with a third party call processing operator in providing enhanced call processing services) to provide calling services. In another example, SS7 Wireless Intelligent Network (WIN) triggers are set in the mobile switches of wireless carriers, such as wireless carrier partners, to provide calling services. In another example, Non- Intelligent Network Signaling (e.g., ISDN, CLASS Call Forwarding services) is used to originate, terminate, forward, and bridge calls.

Throughout the following description, the term "Web site" or "Web" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well.

Further, while the following description refers to example network and telephony standards and protocols, other standards and protocols can be used as well. The term phone address can include a SIP address, a Skype address (or other peer-to-peer Internet telephony network address), a wireless phone number, an International number, an E.164 phone number, or other address. While Skype is referred to herein, other peer-to-peer telephony networks (e.g., having a decentralized and distributed user directory distributed among the nodes in the peer-to-peer telephony network) may be used as well. While certain phone addresses are referenced for purposes of illustration, other electronic addresses or locators can be used as well.

In addition, while references may be made to electronic address books or contact lists, other data stores and formats can be used to store contact information. While certain intelligent network triggers are referred to herein, other triggers or events can be used as well. In addition, unless otherwise indicated, the functions described herein may be performed by executable code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system or data device, other computer or electronic systems can be used as well, such as, without limitation, an interactive television, a networked-enabled personal digital assistant (PDA), a networked game console, a networked entertainment device, a smart phone (e.g., with an operating system and on which a user can install applications) and so on. While certain references are made to certain example system components or services, other components and services can be used as well. In addition, while certain user inputs are described as being provided via phone key presses or by clicking on a button, optionally, user inputs can be provides using other techniques, such as by voice or otherwise. While certain phone numbers are referenced for purposes of illustration, other phone numbers or electronic addresses or locators can be used as well.

While some examples refer to certain example messaging protocols (e.g., SMS or MMS) for illustrative purposes, other messaging protocols can be used as well (e.g., instant messaging, email, etc.).

Figure 2:
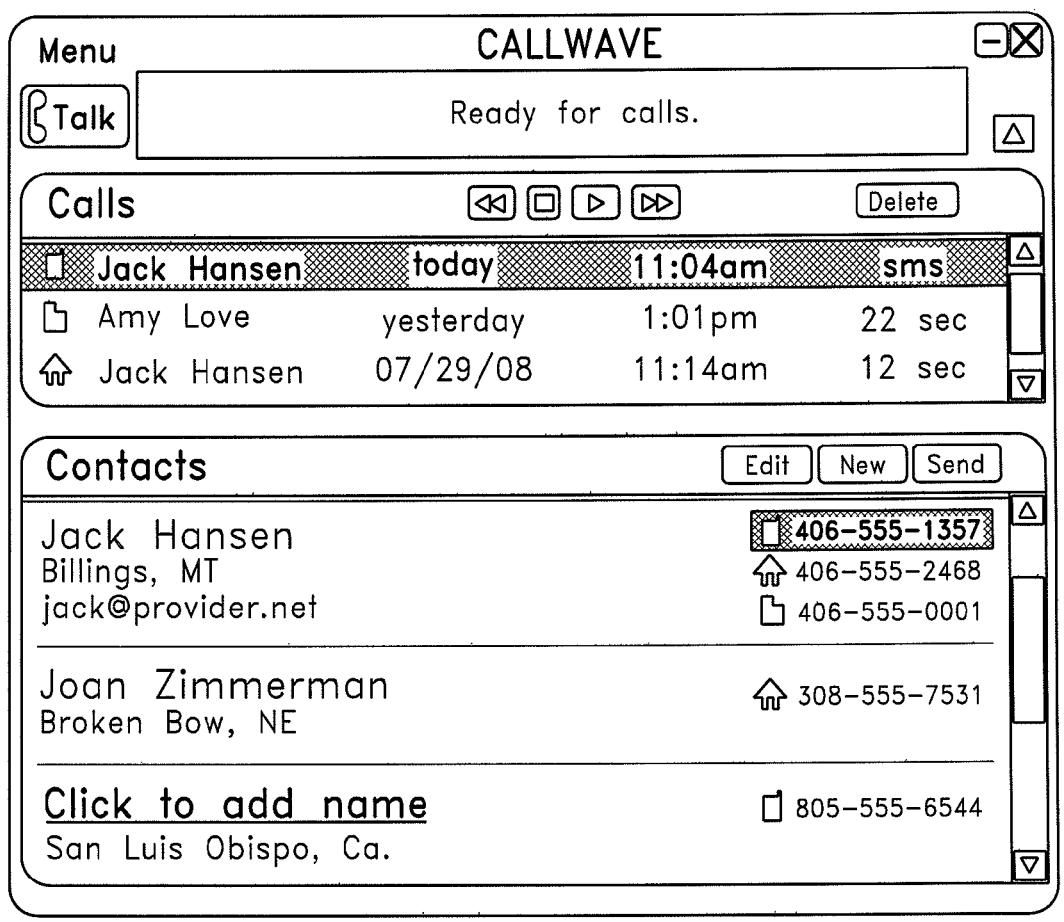
FIG. 2 illustrates a first example telecommunications client call log and user contact interface.
Figure 3:
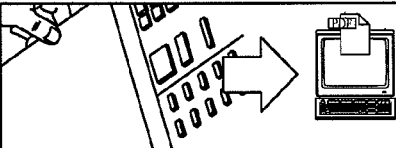
FIG. 3 illustrates a second example Web-based telecommunications client call log and user contact interface.
Figure 4:
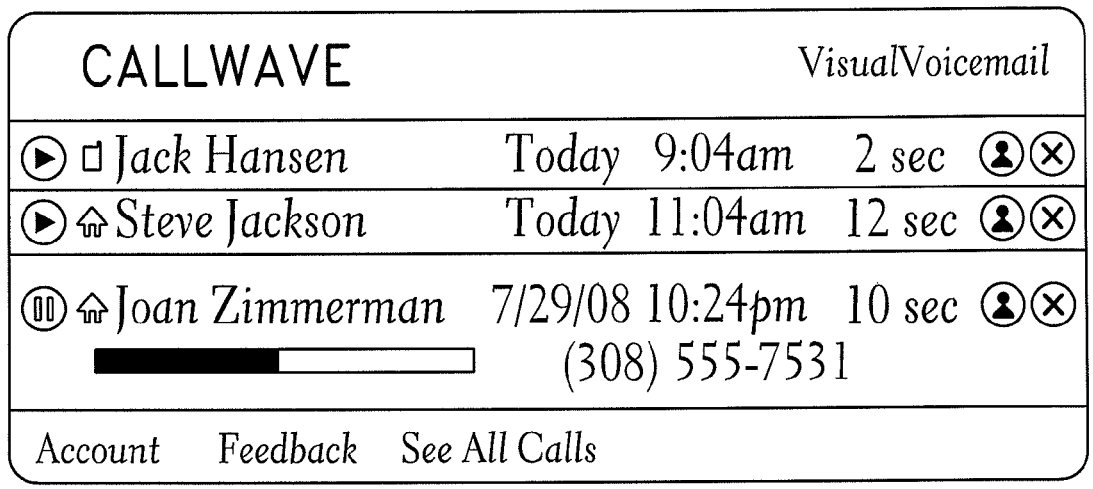
FIG. 4 illustrates a third example Widget-based telecommunications client call log user interface.

In addition, certain call management capabilities described herein make use of a telecommunications client (e.g., a personal computer client, a client hosted on an interactive television, a network personal digital assistant, a smart phone, or a wireless phone with an Internet connection, etc.) to give the customer access to and management of calls (e.g., see example user interfaces illustrated in FIGS. 2-4). Optionally, a customer can have multiple clients hosted on multiple computers or other hosts.

In an example embodiment, the telecommunications client application (see, for example, FIG. 2) connects to and communicates with a call processing system 121 via the Internet, an intranet, or other network. The client application, executing on a subscriber's computer terminal or other host, can make the subscriber's online presence known to the call processing system (e.g., by transmitting a message over the Internet to the call processing system 121).

Optionally, the client can be used to receive, edit, and display call log data from the call processing system (e.g., a list of calls placed to/received by the subscriber, or placed by the subscriber, including phone numbers, caller or called party names, date/time of the call, an indication as to whether a call was an outbound/inbound call, the city/state of the caller/called party, type of call voice or fax, etc.), and/or call alert data (e.g., for an active call, listing the caller phone number, name, city/state, and/or call status (e.g., ringing, playing greeting, recording caller message, terminating call, displaying fax)). Optionally, the call alert also plays an audible signal, such as a ring tone.

The client application can display a log of recorded messages from callers, and optionally can provide playback controls (e.g., play, fast forward, rewind) for playing back or displaying the recorded message (e.g., a voice message, a video message, a fax message, etc.) via the client computer terminal. The client optionally can also be used to screen calls (e.g., wherein the call processing system streams a message being left by a caller to the client so that the called party can listen to the message in substantially real time) and to instruct the call processing system to accept calls on the host computer terminal, forward calls, refuse calls, initiate call conferencing, and to otherwise provide call handling instructions. Options are also provided in the client to respond to calls using a text reply option and/or multimedia reply option. In addition, options are provided whereby a user can search their contact database and/or the web.

For example, when a call alert is received by the client, as part of call presentation, a ringing sound is optionally played via the client host. Optionally, the incoming call is displayed in a call alert user interface for a first amount of time (e.g., a set time, such as 5 seconds, or for a user configurable period of time), and then the call appears in the associated call log.

A telecommunications client is just an example user interface. FIG. 3 illustrates another example call log user interface presented via a browser to a customer. The browser can be, by way of example executing on a computer terminal, such as a personal computer, a Wireless Application Protocol (WAP) or browser-enabled phone, a PDA or the like. The call log can be accessed by supplying the appropriate URL to the browser and optionally providing log-on information, such as a user name and a password. The example user interface includes a call log, including, when available, the name/phone address of the caller, the day and time of the call, the length of the call, an indication as to whether a message was left, and controls for playing back recorded message. In addition, if a message is being played back, optionally corresponding transcribed text is displayed in a synchronized manner with the voice message playback. Clicking on a log entry causes a contact record associated with the caller to be presented (e.g., including name, company name, mobile phone number, work phone number, email address, physical address and/or other information). In addition a text field is provided via which the user can enter a text message to be transmitted to the selected log entry recipient.

Some or all of the information and functionality provided by the user interfaces discussed can be provided by a widget or a gadget, such as that illustrated FIG. 4. A widget can be in the form of a portable code that can be installed and executed within a Web page (e.g., an HTML-based web page) by an end user without requiring additional compilation. By way of illustration, a widget can be in the form of a window (with or without a border) with a particular appearance and behavior, a text box, a media player, etc. A widget can optionally accept and process user inputs. A gadget is equivalent to a widget that works in a Google framework. Other types of applications can be used as well to provide the functionality of a widget or gadget.

The functionality, operation, and implementation for an example service retaining, organizing, presenting, and responding to calls, messages, other objects will now be described in further detail.

GLOSSARY

AIN—Advanced Intelligent Network
CP—Carrier Partner
LP—Intelligent Peripheral
MMS—Multimedia message service
MSC—Mobile Switching Center
PCM—Pulse Code Modulation Voice Encoding
SCP—Service Control Point
SMPP—Short Message Peer-to-Peer Protocol
SMS—Short Message Service
SS7—Signaling System 7
WIN—Wireless Intelligent Network Media Source—A Media Source is a source of media, such of, by way of illustration, customer/subscriber media. By way of example, media may be generated by a Call manager in response to a call to a customer. By way of further example media can also be generated by campaigns or by demo messages associated with service types. A given Media Source is optionally identified by a unique MediaSourceId.

Media File—A Media File is a file created by a Media Source. The system holds audio, fax, images, movies/videos, text messages, voice messages, and/or other type of media. A given Media File is optionally identified by a unique identifier (e.g., a 64 bit MediaID) which can be thought of as a foreign key from the database to the media storage. The database can have multiple rows with the same MediaId.

In this embodiment, once created, a Media File cannot be changed. If a change is required, a new Media File is created including changes from the original Media File, and the database is updated with a corresponding new MediaId. Optionally instead, a Media File can be changed.

Encoding—An encoding describes the format of a media file in storage. Audio files can be optionally formatted using lossy or lossless encodings, such as in GSM, MP3, PCM, AAC, Dolby Digital, Vorbis, WMA, or other encodings, by way of example and not limitation. Faxes can be optionally formatted in XIF, TIFF PDF, and/or other encodings. Video files can be formatted using lossy or lossless encodings, such as in MPEG-2, MPEG-4, H.261, H.263, H.264, AVS, or other encodings. Image Video files can be formatted using lossy or lossless encodings, such as in JPEG, TIFF, GIF, RAW, PNG, SVG, or other encodings.

Primary Encoding—The primary encoding is the default or primary storage format for a given media file. The primary encoding for an audio file in this example embodiment is the compressed GSM encoding (optionally instead, the primary encoding can be specified by a system operator to be MP3, PCM, or other format). The system only maintains redundancy for files stored in the primary encoding.

Alternate Encoding—The system can store copies of media files in alternate encodings. These alternate encodings can be used to provide higher quality media (e.g., audio, video, or image media) if a request is made for an encoding other than the primary encoding. Redundancy is optionally not maintained for files stored in alternate encodings.

Volume—A Volume optionally contains the media generated by a media source on a single day (or other selected time period). A Volume is identified by a VolumeId.

Physical Volume—A Physical Volume optionally holds one copy of the Media Files associated with a Volume in a file system.

Media Store—A Media Store is a collection of Physical Volumes on a file system.

FIG. 1 illustrates an example advanced telecommunications network environment.

A service provider or carrier (e.g., a Carrier Partner) customer may have one or more landline or wireless phones that connect to a local exchange switch, an SSP 112 (Service Switching Point), or MSC 114 (Mobile Switching Center) in the carrier's network. The customer may also have one or more hosts (e.g., personal computers, networked televisions, personal digital assistants, smart phone, etc.) running a telecommunications client 108. In addition, a customer may have one or more POTs phones, mobile phones 102, 103, phones 101 connected to a broadband connection (e.g., via a cable modem or DSL modem) wherein the phone (e.g., an analog phone coupled to an analog phone adapter (ATA), a VoIP phone, a Skype phone, etc.) digitizes and packetizes voice data before transmitting over the broadband connection (e.g., using SIP, Skype/peer-to-peer, or other protocol) to a call routing service provider or other destination. A caller may be associated with a calling phone 100 (e.g., a POTs phone, a wireless phone, a broadband phone, etc.).

The telecommunications client 108 has one or more user interfaces that display some or all of the following: a call log, text messages (including transcribed voice message), a contact record/list, an optional automated character, and active, in-progress calls. The customer can elect to screen or take an active call or respond to a caller with a text message. Optionally, calls can also be made (originated) via the telecommunications client 108 (e.g., where the host is equipped with a speaker and microphone). Optionally, information about a caller can be retrieved through a search function.

In this example, the call processing system 121 has a number of components, some of which are optionally centralized at a given location, others of which may be co-located in the carrier's network (e.g., to reduce network transport costs). A SCP (Service Control Point) is an optional AIN component that interacts with the SSPs (e.g., using the TCAP (Transaction Capabilities Application Part) protocol). AIN triggers are armed for the customer's landline phone number/address/account so that when calls are made to or from that phone, a trigger fires and causes the SSP 112 to query the SCP for instructions on how to handle the call. The SCP is optionally also configured to perform TCAP queries to other SS7 components as needed by some services (e.g., request Automatic Callback from another carrier's switch when a line becomes idle).

In a non-AIN deployment, the call processing system 121 optionally interconnects with the PSTN using, by way of example, SS7. In this case, in an example embodiment, the SS7 signaling information associated with a call terminates on a Call Controller subsystem or the like, and the trunks (or bearer channels) terminate on one or more call managers 122 (described further below). Optionally instead, the Call Controller subsystem and/or associated functions thereof, are included in the call manager 122 subsystem.

In a VoIP deployment scenario, the call processing system 121 interconnects with the PSTN through an IP connection using, for example, Session Initiated Protocol (SIP) signaling. The IP network is optionally directly connected to Internet devices or calls are gatewayed from IP-to-PSTN at Network Points-of-Presence (NetPOP) which provide access points to the Internet 120.

In an example embodiment, SS7 Wireless Intelligent Network (WIN) triggers are set in the mobile switches of Wireless Carrier Partners to provide similar calling services as described herein with respect to a landline phone for a customer's mobile phone number/address/account.

In an example embodiment, the call processing system 121 also contains one or more systems referred to as call managers 122. The call managers 122 are connected to the PSTN (e.g., via ISDN using the ISUP (ISDN User Part) protocol, by way of example, although other protocols can be used). The call managers 122 provide some or all of the following: provide a call screening service when screening is to be provided, record a message from a caller that is to be recorded, provide a voice prompt or message that is to be played to a caller and/or called party, record a facsimile document, detect speech or DTMF tones, convert speech that needs to be converted to text (e.g., via the voice to text engine 132, which may be located in or external to the call manager 122 and may perform speech recognition using Hidden Markov Model, dynamic programming approach, neural network, knowledge-based techniques, and/or other techniques), and/or provide a gateway between the SS7-based networks (PSTN) and SIP-based networks (VoIP). The example call manager 122 optionally can also act as an IP (Intelligent Peripheral), another AIN component that the SCP can instruct the SSP to connect into the call for interaction with the called and calling party. The IP/call managers 122 and SCPs in the call processing system 121 optionally share a Call Registry that stores information about active calls.

The session managers 128 in the call processing system 121 optionally track telecommunication client presence and interact with a given telecommunications client (e.g., a client application hosted on a personal computer, PDA, smart phone, or a networked television) as call log, contact, and/or customer data needs to be synchronized with the centralized databases to provide the customer, via the client, with updated log, contact, and/or customer data. The session managers 128 also optionally provide the SCP in an AIN environment and call manager 122 in a non-AIN environment with service configuration information for the customer involved in a call. During an active call, the SCP and/or IP/call manager 122 optionally directly or indirectly interact with the telecommunications client 108 to provide call progress information, and to stream audio and/or visual content.

The call processing system 121 in this example contains centralized databases and/or a general-purpose storage area, optionally including, but not limited to, some or all of the following: a call log database, a contacts database, and a customer database 134. Optionally, the databases are not centralized and may be distributed geographically and/or over different systems. The call log database stores call events and related data for incoming and/or outgoing calls and text and/or multimedia messages. The contacts database stores information and parameters (e.g., names, identifiers, and/or phone numbers/addresses, birthdays, notes, automated characters, etc.) associated with a sender, called, or calling party. The customer database stores information and parameters (e.g., account data and configuration information) associated with subscribers/customers/users.

In this example, short term storage 138, 140, and long term storage 142, 144 may include one or more of the foregoing databases. Data stored in the short term storage may be copied or transferred to long term storage 142, 144 after a specified period of time or periodically. The long term storage 142, 144 may include, by way of example, optical storage, magnetic disk drives, and/or tape storage.

The call processing system 121 optionally includes other subsystems, such as some or all of the following: a router subsystem, which serves as an interface to the Internet to manage communications between online IP client devices and call processing servers, an SMS server 124 subsystem which serves as a mail relay to transmit and receive SMS and MMS messages, a search engine 136 which can be used to search and sort archived calls, text and voice messages, contacts, and other kinds of phone related objects, a Customer Relationship Management (CRM) system 130 for monitoring and analyzing usage data and promoting new products and services and for providing related information to a operator terminal 146, a web server subsystem 126 to manage a "web site" associated with the call processing system 121 (e.g., via which a user can access an account set-up/configuration user interface, a call log, a contacts database, etc., using a browser or other network user interface), etc. These subsystems are optionally interconnected via a Local Area Network (LAN), a Wide Area Private Network (WAN), and/or a Wide Area Public Network (e.g., Internet).

The kind of objects that can be stored by a service provider is optionally not limited to a particular set of objects. Therefore, the list below includes non-limiting example illustrative objects of the kind that people can relate to and make long term use if they are readily accessible but is not meant to be a complete or limiting list:

Call—the meta data associated with a phone call, such as, by way of example, some or all of the following: time, duration, disposition, and caller information (including but not limited to caller ID, caller Name, calling number, privacy restrictions); may also include capture (recording) of the call conversation.

Contact—information about a person with which the user interacts, such as, by way of example, how to reach them (e.g., phone address(es), SMS/MMS addresses, email address(es), instant messaging address(es), and/or other addresses), other personal information, such as a picture, birthday, name of family members, place of employment, job title, etc.

Message—voice, fax, or text message that is exchanged and the associated meta data, and attachments such as pictures, files, music, etc.

Picture—a picture that is taken with the phone or received from others.

Tune—a purchased piece of music with copyright protection.

Ring tone—a ring tone in general use or associated with a particular contact.

Greeting—a personal greeting for general use or associated with a particular contact.

Some of foregoing content can be backed up information corresponding to information that is currently in use and/or stored on the user's phone. Thus, if the user loses their phone or their phone malfunctions and so that information is lost, the information can be restored via the back up. Optionally, the back up data can also be copies onto other terminals associated with the user.

Other content that may be stored is of the kind that accumulates over time and contains items of information that is valuable to reference later, and may be too voluminous or unwieldy to store on the user's phone. The information of interest is accumulated as calls occur and messages are exchanged. The information is optionally also captured as part of routine synchronization with the phone handset via a wireless data connection (e.g., via a carrier network, WiFi, Blue Tooth, etc.) or via temporary wired connection to a computer, such as a personal computer or smart phone. Optionally, certain information is retrieved from SS7 network databases or other databases.

Example areas of interaction where information is gathered on behalf of the user include:

Voice Mail—When a caller calls a user, the call may be answered by a voice answering system (e.g., on a call forward condition when a user line is busy, on a call forward no answer condition, on a call forward all condition, when the call is placed to a virtual number "owned" by the call processing system 121 and associated with the user, etc). The voice answering system can play a greeting to the caller, asking the caller to record a message, and if the caller leaves a voice message, it is recorded and stored for later access and/or transcription. In addition to the voice message, information regarding the caller, when available, can be captured and stored. For example, some or all of the following caller-related information can be captured: the caller phone address, the caller location, the caller name (e.g., retrieved via a database query using the phone address, such as a query to one or more of a SS7 CNAM database, a Line Information Database (LIDB), a name cache, a contact address book, etc.).

Fax Mail—A facsimile can be received and stored (e.g., by a fax server). For example, the fax can be received in conjunction with a voice mail interaction or by the fax initiator directly dialing a virtual fax number "owned" by the call processing system 121 and associated with the user. As similarly described above, information about the caller may also be accessed/received and stored.

Short Message—Short messages (SMS/MMS) may be exchanged between people via phones and computers (e.g., personal computer), or other SMS capable terminals and stored by the system. The messages may be captured, by way of example, at the SMSC 118 level, and for interactions with a computer, the messages may be captured at the computer. As similarly described above, information about the sender may also be accessed/received and stored. For example, sender may information may include the sender phone address or an email address. Instant messaging chat interaction can also be tracked and stored, and information regarding the chatters can likewise be stored.

Phone Call—Information about inbound or outbound calls that do not result in a busy or no answer condition may be captured by intercepting the call (e.g., using AIN or WIN triggers). Such interception is non-intrusive, yet can provide full or partial information related to the call including phone information about the other party (e.g., the caller or called party phone address, city/state, etc.), disposition of the call, and/or call duration. The triggers can also be used to establish a call leg by which the conversation can be conferenced with a call processing system 121 and recorded if so desired.

Handset Synchronization—Synchronization software may be deployed on a telephonic handset whereby data on the handset may be synchronized with the server (e.g., where data on the handset is copied and/or used to update data stored on the call processing system 121, and/or where data stored on the call processing is copied and/or used to update data stored on the handset. The synchronization may be originated by the handset or optionally by the server. Optionally, synchronization may be configured to occur automatically when a relevant change is detected on the handset or when the handset is notified of a change in the data archive that originated from other sources. Optionally such synchronization may be restricted to occur only when in higher bandwidth settings, e.g., WiFi, 3G, etc. Synchronization may be optionally invoked manually by the user. The data synchronized may optionally include some or all of the following: contacts, pictures, tunes, ring tones, music, movies, configuration information, email, text messages, instant messages, etc.

Web or Computer Interfaces—The data that is archived may be optionally augmented from other sources (e.g., Outlook (or other personal information manger) synchronization of contacts, or the data may optionally be directly altered by the user through Web and computer interfaces). The Web/computer interface is considered an extension of the handset in that, optionally, it can make direct use of the stored information and generate information that is stored there as a result of the user generating calls or messages from that device.

As discussed above, some of the information that is gathered directly is augmented with other related data. This optionally includes name information from the SS7 CNAM database and the current carrier owning a number from the SS7 LNP 116 database. The information optionally also includes address information (e.g., from an SS7 LIDB database). This information is optionally used to automatically populate (in whole or in part) contact records associated with a user contact data store to form another type of information that is captured.

The captured/stored data is organized to be useful and is made readily accessible to join various pieces of information of interest, (e.g., based on time, personal contact, thread of interaction, or search text). Some or all of the following techniques are optionally used to help organize the data and make it more accessible:

Voice-To-Text—Voice messages and conversations are converted to text optionally using large vocabulary continuous speech recognition technology, by individuals transcribing speech, by individuals speaking clearly into speaker dependent or independent speech recognition subsystems, or some combination of the recognition technology and individuals transcribing. Voice-to-text conversion can be performed as part of initial message presentation and/or at a later time during archiving.

Optionally, the voice-to-text process is configured (e.g., by a system operator, a subscriber, or other authorized person) to be restricted to performing keyword spotting, for example to spot words specified in a keyword file defined by a subscriber and/or a system operator, which may, by way of example and limitation, include proper/family names (e.g., John, Jane, Mom, Dad, etc.), activity words (movie, lunch, dinner, gym, walk, etc.), and/or words indicating urgency (e.g., "as soon as possible", "ASAP", "immediately", "when you get a chance", "no hurry", "no rush", etc.).

Optionally, the voice-to-text process is configured (e.g., by a system operator, a subscriber, or other authorized person) to be restricted to convert only the lead-in of the voice communication to text (e.g., the first specified number of words (the first 10, 20, or 30 words), the words in a first time period (e.g., the first 5 seconds, 10 seconds, 15 seconds), or to convert the entire message.

Conversion to text facilitates search and storage. Optionally, the text is indexed (e.g., using an inverted index, a forward index, or other index, optionally using compression to reduce the size of indices), wherein the searchable index is searched in response to a query to speed search performance.

Optical Character Recognition (OCR)—OCR (software that translates text images into computer readable text) may be applied to fax messages to facilitate search and to make these messages more usable and optionally editable.

Object/Face Recognition—Pictures may be analyzed to recognize objects and faces (e.g., using eigenface, fisherface, the Hidden Markov model, Dynamic Link Matching or other technique), to assign names to the pictures, and to thus allow pictures to be categorized (e.g., by the system and or the subscriber) and made keyword searchable.

Interaction Threads—Associations that can be made to relate a sequence of interactions (e.g., as specified by a system operator or subscriber) are optionally tracked for future reference. In some cases this may be via directly supplied subject information or specific IM chat, email, or SMS sequences. Optionally, the information is inferred based on times, parties involved, and the actual or converted text involved.

In an example embodiment, the collected data is organized around the objects discussed above. Data that has associated text can be searched using a text search. Certain types of data are organized into lists that are naturally indexed (e.g., by phone address, email address, other address, caller/initiator name, called party/recipient name, etc.) and optionally these keys (e.g., address, name, etc.) are used to locate and access the desired data.

Optionally, all or a specified subset of information that is captured is stored indefinitely, until the user decides to delete it, or for a time period specified by the user and/or the system. Optionally even if subscriber specifies that certain information is to be deleted, the system may still archive such data for a period of time or indefinitely, but will "hide" such data from the subscriber presentation. Thus, for example, if a user conducts a search, such hidden data will not be presented to the user in the search results, even though it may match the user's query. Optionally, the user can request and be provided with access to such hidden data. Optionally, a user interface is provided via which the user can specify that certain data is to be hidden, rather than deleted.

Optionally, by default, the information is only permitted to be accessed by the user, but the user may optionally establish groups that are allowed to have access to specific information or to certain categories of information (e.g., the user's contacts or a specified subset thereof, the user's outgoing pictures, received pictures, and/or a subset thereof, the user's voice mail messages, or a subset thereof (e.g., those from certain specified callers)). The user may define the group using a corresponding user interface.

For example, a user may activate a create group control, name the created group, and then in effect drag the shared information into that group (e.g., "dropping" the information onto a displayed group name or into a displayed group file). Optionally, some information is explicitly and optionally automatically designated or identified as private and may not be shared (e.g., some or all of copyrighted information, such as music, movies, etc.). Information about a caller that is marked restricted in the network (e.g., the caller phone address when the caller has Caller ID blocking) is optionally not shared with the user but the user may tag information received from that person with their name once they know it.

Given that storage is optionally indefinite, is such circumstances the storage is preferably large and reliable. In an example embodiment, this is achieved with large redundant data farms with geographic separation, using RAID, distributed peer-to-peer redundant data storage and/or other techniques.

The archived information is optionally made to be accessible from various devices including some or all of the following: a computer, a handset in voice mode or data mode, a networked television, or other device. The access method may be specific to a particular kind of information (e.g., a list of most recent calls, a list of contacts, or the text from a converted voice message to be sent in an SMS) or it may be very general (e.g., search for all interactions with a particular individual in a given timeframe that involved a particular subject). Thus the stored information can be accessed to present to a user new, recently arrived information, and/or older information (located by searching back through relatively older data).

The user interfaces for access to the stored/archived information are optionally device specific. Thus, by way of example and not limitation, the user interface for a computer may be provided via a Web 2.0 widget 104, a more traditional Web portal 106, and/or an executable client 108. For a handset, the interaction is optionally tailored to the available display space and interaction mechanism, where the functionality is similar although optionally reduced in scope. For example, for a handset, certain logos, menus, images, and the like can be reduced in relative size or eliminated. FIGS. 2-4, discussed herein, illustrate example embodiments of various user interfaces that can be used on various terminals.

Additional example processes for utilizing stored/archived information will now be described.

Data synchronization is optionally provided which enables data (such as some or all of the data discussed above) from an archive to be accessed and/or utilized by a remote handset. For example, if user needs to search for contacts beyond the manageable number of contacts the handset can manage (e.g., wherein not all the contacts are stored on the handset), the system automatically reaches back into the archive stored remote from the handset to locate contacts stored in the archive based on user search terms or index selection (e.g., contacts beginning with the letter "A"). A user can similarly access archived call logs, message text, etc.

Optionally, a text reply or call back to an caller/initiator placed via a call log entry corresponding to a communication from the caller/initiator automatically causes one or more databases (e.g., SS7 databases) to be queried if call log entry is older than a certain date. By way of example, if a call log entry or response to a search query is older than a year, the system may be configured to automatically query a database (e.g., an LNP database) to determine if the number has been ported to another carrier or has been provisioned to another user.

Usage information can be accumulated that can then be provided to the Customer Relationship Management (CRM) engine 130. The CRM engine 130 can utilize such information to take appropriate action with respect to a user (e.g., a subscriber) associated with the usage information. For example, some or all of the following information can be obtained, stored, and used to determine what telecommunication services one or more participants might be interested in:

who a subscriber has been calling;
who has called the subscriber;

how many people the subscriber has called;
how many long distances calls the subscriber has placed;
how many video calls the subscriber has placed/received;
how many calls have been to/from other subscribers of the carrier;
the duration of local and/or long distance calls;
the timing of calls (e.g., how many during prime hours, how many during non-peak hours/on weekends);
how many text message (e.g., SMS messages), multimedia messages (e.g., MMS messages) and/or photographs/videos the subscriber has sent and/or received;
etc.

Figure 6:
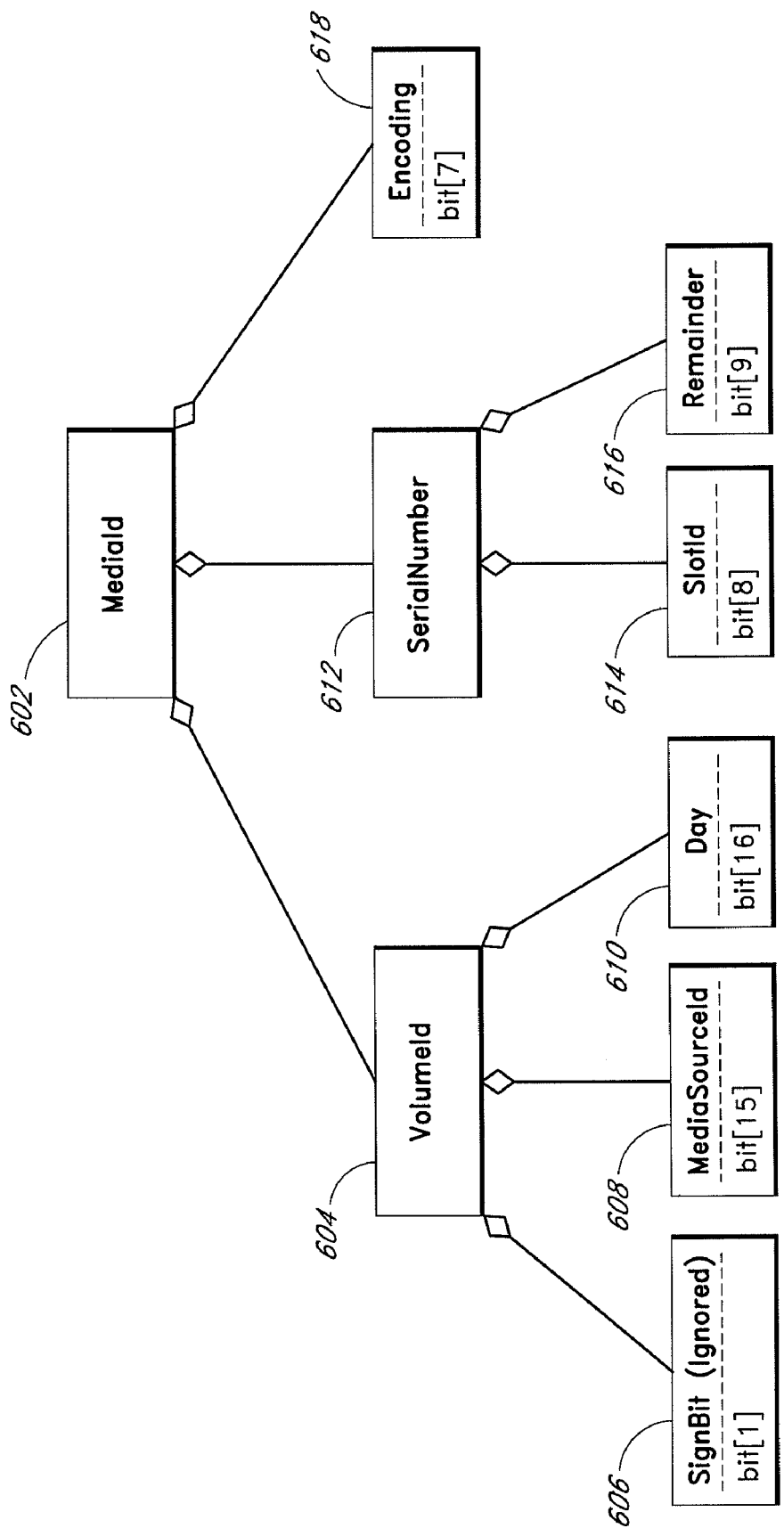
FIG. 6 illustrates an example structure of a media file in an archive storage system.

FIG. 6 illustrates an example embodiment of a collection of Media identifiers and their relationships used in an example Media Archive Storage system. In the illustrated example, a media identifier 602 can include some or all of the following information:

A volume identifier 604. which may include:
A sign bit 606, which is optionally ignored;
A media source identifier 608;
A day identifier 608 (indicating the date the media was received by the system, the media creation date, and/or a last edit date);
A serial number 612, which may include:
A slot identifier 614;
A remainder; and
An encoding identifier 618.

Figure 7:
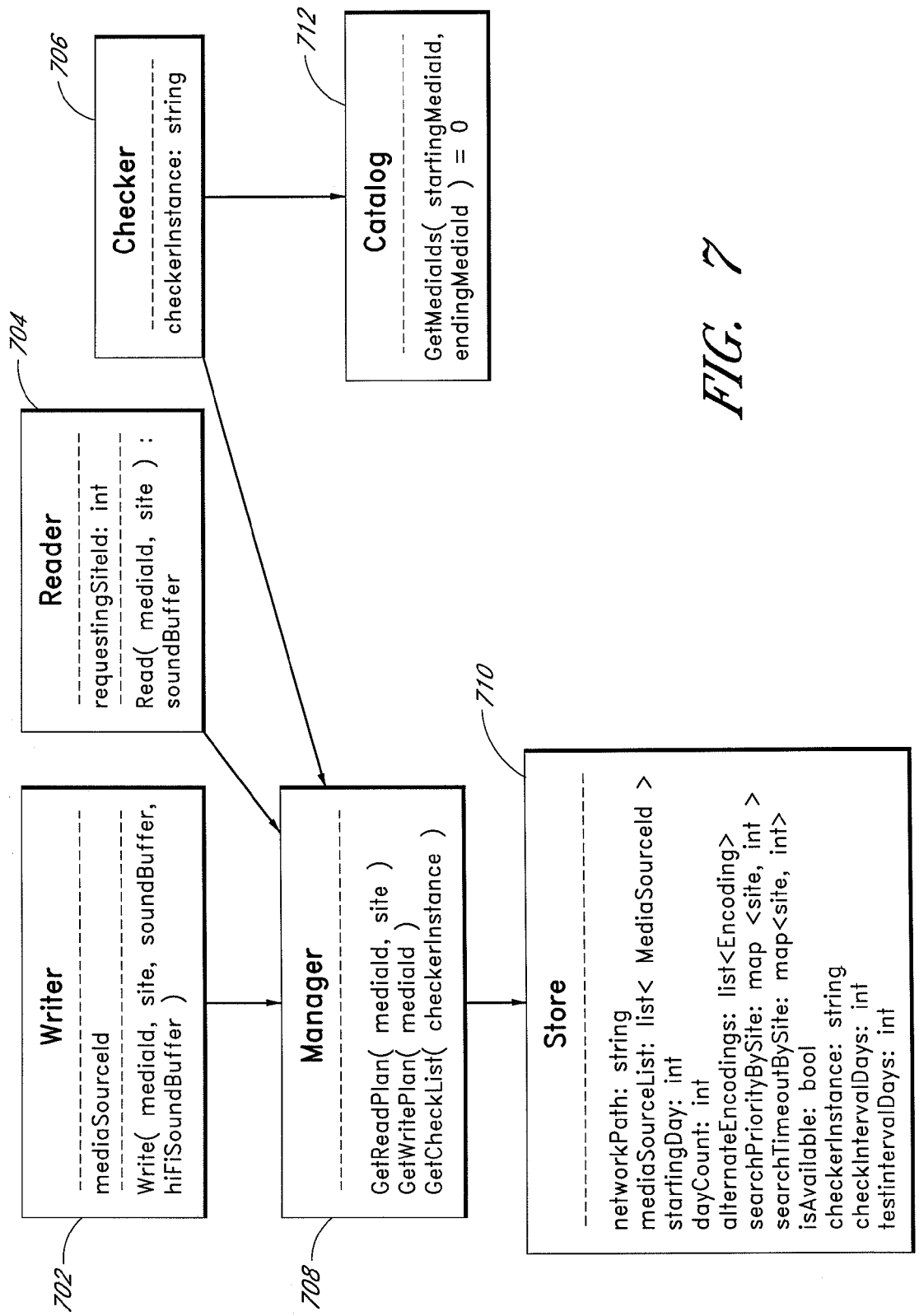
FIG. 7 illustrates example media objects in an archive storage system.

FIG. 7 describes an example embodiment of Media objects and their relationships used in an example Media Archive Storage System. The prefix MEDIA_ has been omitted. The objects include a writer 702 (which optionally reads media), a reader 704 (which reads media), a checker 708 (which checks media and/or store integrity), a manager 708 (which manages reads, writes, store/media checks (which optionally reads media), a catalog 712, and a store 710, which stores media.

With respect to writing media to a data store, when new media is generated, the media is optionally written to the data stores (e.g., 3 different devices at 2 different locations or other combination of data stores and geographical locations used for relatively short term data storage) that store media for the Media Source on the current day (or other specified time period). Different data stores are optionally associated with different local and/or remote search priorities, wherein the search priorities can be utilized in determining in which order the data stores are to be searched which search for content (e.g., media), as described below.

Optionally, the file writes are atomic, that is, the write operation succeeds or the media file will not be stored in the file system. In an example embodiment, if a write operation fails, a minor exception is optionally logged by the system. If all writes fail, the write operation fails with an optional exception or error event.

In an example embodiment, if the Media Store is configured to store media using alternate (multiple) encodings, the media is encoded and written to the store(s) by a Media Writer in the plurality of specified encodings.

With respect to accessing media from a data store, when a media file is requested, the system conducts a search plan. The system locates a data store that stores the requested media file. In an example embodiment, the system searches for the media in an order based on a search priority configuration of these stores. Optionally, the store with the lowest priority (e.g., "lowest" in terms of lowest priority number but highest in terms of search order) is searched first. If the store has not returned a media file before the configured duration for that store, a search is started on the next lowest priority store, but the previous search is optionally not cancelled. If two stores have the same search priority, they are optionally searched concurrently and the highest search duration is used.

If the desired encoding is different than the stored encoding, the media is optionally transcoded using the highest quality encoding available (e.g., the highest quality permitted by the transcoding configuration, as specified by a system operator or other authorized entity) or using the quality of encoding specified by the customer (e.g., manually specified when the request was made, specified by the customer in their account settings, specified by the customer's client application requesting the media, or otherwise). Optionally, the quality of encoding is selected based at least in part on the type of network the encoded media will be transferred over and/or the current network performance. If media is transcoded in response to a media request, such transcoded media is optionally not stored in the system data store once the transcoded media is transmitted to (or optionally, received by) the customer.

Optionally, if, in the process of conducting a search, the system determines that a requested media file is missing, a named exception (or error event) is optionally logged with the media file ID and/or the path (e.g., the full path) to the missing file.

In order to monitor and maintain the performance of the data store, a periodic (e.g., nightly, bi-daily, weekly, or other specified or random time frame) process is optionally checks the integrity of media in the archive. A telnet or other access protocol command can be used to start checking on a single Physical Volume in a Media Store, or across the entire Media Store.

This monitoring and checking process performs some or all the following:

If a Physical Volume is missing from a data store it is added to the store;
If there are extra Physical Volumes in the store they are removed;
For a Physical Volume that has not been checked in the configured check interval for the Media Store:
If a file is missing from the Media Store, the monitoring process raises a minor alarm (e.g., via a notation in a database, via an electronic message transmitted by the system to an operator, etc.) and copies the media from an alternate data store into the Media Store that is missing the file. If a copy cannot be found in the alternate data store(s), the process raises a major alarm (e.g., transmits a message to an operator or another program indicating the severity of the error so that the error can be addressed with appropriate speed);
If a file in the file system is not referenced by the database (e.g., indicating that it is not a file of interest to the system), the file is moved to a "recycle bin", as described below.
If a file is no longer referenced by the database, the file is recycled (e.g., by changing the name of the file in the file system);
The monitoring process updates the lastChecked date (that indicates when the last volume check was performed) on the Physical Volume;
For a Physical Volume that has not been tested in the test interval for the Media Store, the monitoring process performs some or all of the following:
Reads the corresponding media files and verify they can be read (e.g., without errors or without non-correctable errors). If a read error occurs, replaces the file with a copy from an alternate store (or performs a correction if possible, using correction codes (CRC) associated with the file if such are available) and raises an alarm (e.g., a major alarm or a minor alarm). If a copy cannot be found, a major alarm is raised;

Updates the lastTested date on the Physical Volume to indicate that date (and optionally time) the Physical Volume was tested.

In an example embodiment, the "recycle bin" is provided as a parallel directory hierarchy on the same drive that holds media files that are no longer referenced by the database or for which a customer account no longer exists (optionally instead, a different drive can be used to host the recycle bin). Optionally, even if it is determined that a file is no longer referenced by the database, the file is not deleted immediately, in the event that there is a database problem causing needed files to appear unused. This delay better ensures that a needed file will not be inadvertently deleted. Optionally, the file deletion is performed periodically (e.g., after periodic verification of the database operation). If a database error is detected, optionally the files marked for deletion are rechecked to determine if the deletion marking is corrected or needs to be removed.

Optionally, the storage used by the recycle bin can be reclaimed by deleting the directory hierarchy, or restored by copying the hierarchy over top of the active storage. For example, scripts and/or programs are optionally provided that reclaim some or all storage for files in a recycle bin, or that restore all media stored in the recycle bin.

A Web page and/or other user interface are optionally provided that enables an administrator or other authorized user to configure media stores in the system. Some or all of the following attributes are optionally configurable for a given media store:

the network path to the root of the storage for the media store;

the site associated with the store;

a list of media source identifiers (e.g., mediasourceids) for the volumes it holds;

a range of days (or other time period) for the volumes held on the store. by way of example, this range can be expressed:

as a starting day and an ending day. the store will then hold the media for the days between and including the starting and ending days;

as a starting day without an ending day. the store will then hold media from the starting day through the current day;

as a count of days. the store will then hold that count of days' media, ending in the current day; and/or otherwise.

a list of the alternate encodings (e.g., alternate audio and/or video encodings) available on the store. optionally, the availability of alternate encodings is limited to new media written, to the store, and existing media is not updated. optionally instead, existing media is also updated using alternate encodings.

multiple search priorities (e.g., one for local reads and one for remote reads), as described in greater detail elsewhere herein.

multiple durations (e.g., one for local reads and one for remote reads) as described in greater detail elsewhere herein.

the name of the media checker that is responsible for the store as described in greater detail elsewhere herein.

the timing interval (e.g., expressed in days or other time period) for checking a physical volume as described in greater detail elsewhere herein.

the timing interval (e.g., expressed in days or other time period) for testing a physical volume as described in greater detail elsewhere herein.

Thus, in order to better ensure high availability of stored media, some or all of the following processes are optionally performed: a high availability media file is written by the media storage system to different machines (e.g., at the same and/or different sites which provides for media redundancy while operations staff is responding to the failure of a single store, media stores are regularly tested, media volumes are checked (e.g., shortly after they are created, wherein the system recovers from write failures at the time the media was generated). Further, when moving Volumes from one store to another, the system adds the Volume being moved to the new/destination Media Store (e.g., MediaStore) and checks the new volume (e.g., via a Media Checker telnet interface). When the check is completed, the Volume is then removed from the old store. This ensures that data redundancy is maintained during a volume move.

Optionally, in order to better ensure file availability, the file systems are configured to recover quickly in case of a crash. In addition, alarms generated by the system are closely monitored and the problems indicated by the alarms are addressed with appropriate speed.

In order to reduce cross site traffic (e.g., resulting from media searching) media that is (or that is likely to be) frequently accessed is fetched from stores that are local to the requesting machine if available, and if the requested media is not stored locally, the media is fetched from a remote store. In addition, to further reduce cross site traffic, optionally the Media Checker process is run on the same site and optionally the same machine as the stores it is checking.

In order to reduce energy consumption, some or all of the following steps are taken. Data stored on a given drive is of a similar age (e.g., of the same day, month, range of months, year, or other specified time period). This will allow "older" drives (storing relatively older data that is relatively less likely to be frequently accessed), to enter into a low energy consumption state (e.g., by spinning down) if they are not actively being used, without significantly adversely affecting the access time for most access (e.g., accesses for most more recent data). "Newer" drives storing relatively newer data can be generally kept in a spun up mode to enhance access times of the newer data.

In order to reduce energy consumption, media that is, or optionally that is likely to be infrequently accessed (based on historical access patterns, the media age, and/or the media type) is fetched from the same store, whether the requesting site is remote or local. This enables other drives storing the same infrequently accessed data to be spun down. Thus, in an example embodiment (e.g., in which there are redundant data stores), certain of the redundant data stores may be kept in a spun down and/or sleep state, while one or more other redundant data stores are in the spun up state to provide relatively quick data access. When a request is made, it will be first routed to the spun up drive(s). If the spun up drive(s) are not available (e.g., heavily loaded with other requests, offline because of a network fault, etc.), then the request is sent to the spun down drive, which spins up and provides the requested media.

In order to better ensure that frequently accessed media is of relatively high fidelity, optionally, media is stored with as a high fidelity copy (e.g., with a high bit rate, using lossless compression, or otherwise) for a period of time (e.g., specified by a system operator). For example, the media may be stored as a high fidelity version (e.g., with a relatively larger file size) for a short period of time, within which most accesses would be expected, and then may be stored in long term storage in a relatively lower fidelity version (e.g., in a more compressed version resulting in a relatively smaller file size), thereby reducing storage requirement.

This high fidelity version can be provided to a user in the stored format or can be used as a "master" from which alternate encodings can be generated, thereby enabling requests for alternate encodings to be responded to with the requested encoding having relatively better more accurate reproduction (e.g., better audio) than if the alternate encoding were derived from a relatively lower fidelity copy.

In order to reduce delays resulting from offline or otherwise unavailable stores (e.g., that are inaccessible because of repairs or network issues), stores that are inaccessible or unavailable are marked (e.g., via an indicator stored in memory) as down/inaccessible. Thus, rather than submit a request to an inaccessible system, and then waiting for the access to fail, the system, based on the inaccessibility marking, can first route the request to an accessible store, and the system can avoid submitting the request to the marked system.

Figure 5:
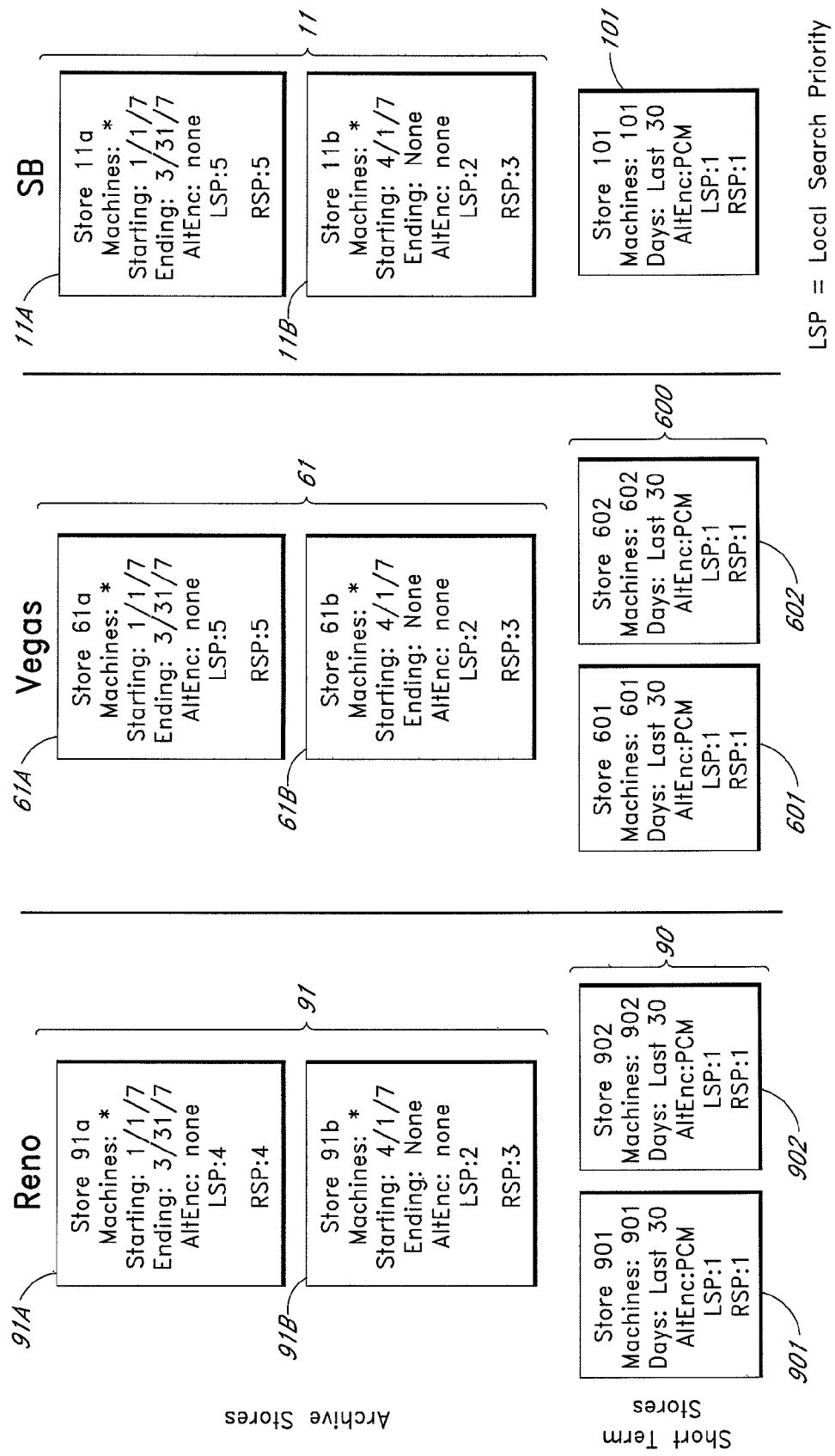
FIG. 5 illustrates an example sample storage configuration.

FIG. 5 illustrates an example embodiment that enables processes described herein. FIG. 5 depicts a sample storage configuration in which media is stored in three separate physical locations, Reno, Nev., Las Vegas, Nev. ("Vegas"), and Santa Barbara, Calif. ("SB"). Fewer or additional physical locations can be used as well. The stores may be associated with a local call manager. The example storage configuration includes long term archive media stores 91, 61, 11, including respectively, stores 91A-91B, 61A-61B, and 11A-11B (fewer or additional stores can be used as well). The archive media stores support machines that generate media. In addition, in this example, each geographic location includes one or more short term stores. Reno includes stores 901, 902, Vegas includes 601, 602, and Santa Barbara includes store 101. Store 901 for example, is a local media store for a Call manager. A given archive store is associated with a "Starting" date field, corresponding to the start date of written media, and an "Ending" date field corresponding to the end date of written media to the media store. The short term stores are associated with a "Days" field indicated how many days of media are stored (e.g., the last 30 days, the last 1 day, or other time period). The stores also have an alternate encoding field (AltEnc) that species one or more alternate encodings (e.g., PCM, etc.). In addition a given store is associated with an LSP field and an RSP field. Media data can be stored in a compressed format in zero or more stores and in uncompressed format in zero or more stores.

The following example use cases illustrates example instances of media data storage and access, read recovery, encoding changes, and checking, using the configuration illustrated in FIG. 5.

TABLE 1

| Write Use Cases | |
| --- | --- |
| Action | Result |
| A Call manager 901 generates uncompressed voice media on Jun. 1, 2007. All stores are available. | Compressed voice media written to 901, 91b, 61b and 11b. Uncompressed voice media written to 901. |
| A Call manager 602 generates uncompressed voice media on Jun. 1, 2007. All stores available. | Compressed voice media written to 602, 91b, 61b, 11b. Uncompressed voice media written to 602. |
| A Call manager 901 generates uncompressed voice media on | Compressed Voice media written to 901 and 11b. Exception logged for |

TABLE 1-continued

| Write Use Cases | |
| --- | --- |
| Action | Result |
| Jun. 1, 2007. Stores 91b and 61b unavailable. | stores 91b and 61b. Uncompressed Voice media written to 901. |
| A Call manager 901 generates uncompressed voice media on Jun. 1, 2007. All stores unavailable. | Voice media write fails with major exception/error. |

TABLE 2

| Read Search Plan Use Cases | |
| --- | --- |
| Actions | Result |
| Read from Reno for compressed voice media generated from 902 on May 15, 2007. Request media in compressed format. All stores available. Current date Jun. 15' 2007. | Search plan includes stores 902 then 61b, and then a concurrent search on 91b and 11b. (Search includes short term store.) |
| Read from Vegas for compressed voice media generated from 601 on Apr. 15, 2007. Request media in compressed format. Current date Jun. 15' 2007. | Search plan includes 61b, then a concurrent search of 91b and 11b. (Search does not include short term store.) |
| Read from SB for compressed voice media generated on Feb. 15, 2007. Request media in compressed format. All stores available. Current date Jun. 15' 2007. | Search plan includes 91a and then a concurrent search of 61a and 11a. (Reads old media from a single store so that secondary sources can be idled.) |

TABLE 3

| Read Recovery Plan Use Cases | |
| --- | --- |
| Actions | Result |
| Read from Reno for compressed voice media generated from 902 on May 15, 2007. Request media in compressed format. 902 unavailable. Current date Jun. 15' 2007. | Search plan includes stores 902 then 61b, and then a concurrent search on 91b and 11b. (Search includes short term store.) Read fails on 902 but succeeds on 61b. |
| Read from Reno for compressed voice media generated from 902 on May 15, 2007. Request media in compressed format. 902 and 61b unavailable. Current date Jun. 15' 2007. | Same search plan as above. Read fails on 902 and 61b. Searches 91b and 11b concurrently and returns whichever returns first. |
| Read from Reno for compressed voice media generated from 902 on May 15, 2007. Request media in compressed format. All stores unavailable. Current date Jun. 15' 2007 | Same search plan as above. Read fails on all stores and the read fails. |

TABLE 4

| Encoding change Use Cases | |
| --- | --- |
| Actions | Result |
| Read from Reno for compressed voice media generated from 902 on May 15, 2007. Request media in specialized (e.g., MP3) format. All stores available. Current date Jun. 15' 2007. | Search plan includes stores 902 then 61b, and then a concurrent search on 91b and 11b. Reads uncompressed media from 902 and transcodes to MP3. |
| Read from Reno for compressed voice media generated from 902 | Same search plan as above. Read fails on 902. |

TABLE 4-continued

Encoding change Use Cases

| Actions | Result |
| --- | --- |
| on May 15, 2007. Request media in compressed format. 902 unavailable. Current date Jun. 15' 2007. | Reads compressed voice media from 91b and transcodes to MP3. |

TABLE 5

Checker Use Cases

| Actions | Result |
| --- | --- |
| Delete a media file on 11a and run the checker on 11a. | Checker reports an exception about the missing file and puts the file back on 11a. |
| Delete all files on 91b and run checker on 91b. | Checker reports missing files. All files returned. |
| Delete reference to mediaid in database and run checker in 91b | Checker discovers unreferenced file and moves the file to the recycle bin. |

Thus, as described above, in example embodiments, in order to ensure that stored media is still accessible even when one or emote stores become unavailable as a result of network failures, host system failures, or drive failures, media is stored across diverse networks, machines and drives. In addition, optionally, database queries used by the media manager program are cached so that the media manager can continue to operate when the database is no longer available.

The system can move media from one store to another. Optionally, the media is moved in day or multiple day chunks, although other sizes can be used as well.

It should be understood that certain variations and modifications of the systems and processes described herein would suggest themselves to one of ordinary skill in the art. The scope of the present invention is not to be limited by the illustrations or the foregoing descriptions thereof.

What is claimed is:

1. A method of processing media received over a communications network, the method comprising:
 receiving, at a computing system including one or more computing devices, media via a telephonic device, the media including voice content;
 storing the media in a first data store with a first degree of compression as a first file of a first size;
 enabling a user to search a transcription of the voice content;
 at least partly in response to:
  (i) a first period of time elapsing, or
  (ii) determining that the media has not been accessed or has been infrequently accessed by at least one user, or
  (iii) the first period of time elapsing and determining that the media has not been accessed or has been infrequently accessed by at least one user;
 determining by the computing system whether the media is to be stored with a second degree of compression as a second file of a second size, wherein
 the second degree of compression is higher than the first degree of compression, and wherein
 the second size is smaller than the first size, and
 at least partly in response to the computing system determining that the media is to be stored with the second degree of compression, storing the media in a second data store as the second file of the second size,
 wherein the second data store is configured to primarily receive media older than a first amount of time, that is infrequently accessed or has not been accessed by at least one user within a second amount of time, or that is older than the first amount of time and is also infrequently accessed or has not been accessed by at least one user within the second amount of time.

2. The method as defined in claim 1, the method further comprising storing copies of the first file on a plurality of geographically separated drives.

3. The method as defined in claim 1, the method further comprising storing the voice content in a plurality of encoding formats.

4. The method as defined in claim 1, the method further comprising storing in association with the first file a media identifier including a media source identifier.

5. The method as defined in claim 1, the method further comprising storing search priorities in association with corresponding media data stores.

6. The method as defined in claim 5, the method further comprising:
 receiving a media search query; and
 searching the media data stores in an order based at least in part on the search priorities associated with the corresponding media data stores.

7. The method as defined in claim 1, the method further comprising keeping the second data store in a spun down state to a greater degree than the first data store.

8. The method as defined in claim 1, wherein the first degree of compression is no compression.

9. The method as defined in claim 1, wherein the first file is in a first encoding format, the method further comprising:
 receiving a request for the media in a second format, the second format different than the first format; and
 transcoding the first file into the second format.

10. The method as defined in claim 1, wherein the media includes a voice message.

11. A media processing system including at least one computing device, comprising:
 a first communication network interface configured to receive communications via a communications network;
 a first data store;
 a second data store;
 a non-transitory computer readable medium the stores program code that when executed is configured to cause the media processing systems to:
  receive media via a telephonic device, the media including voice content;
  store the media in the first data store with a first degree of compression as a first file of a first size;
  enable a user to search a transcription of the voice content;
  at least partly in response to:
   (i) a first period of time elapsing, or
   (ii) an indication that the media has not been accessed or has been infrequently accessed by at least one user, or
   (iii) the first period of time elapsing and the indication that the media has not been accessed or has been infrequently accessed by at least one user;
  determine whether the media is to be stored with a second degree of compression as a second file of a second size, wherein
  the second degree of compression is higher than the first degree of compression, and wherein
  the second size is smaller than the first size and at least partly in response to the computing system determination that the media is to be stored with the second degree of compression, store the media in a second data store as the second file of the second size, wherein the second data store is configured to primarily receive media older than a first amount of time, that is infrequently accessed or has not been accessed by at least one user within a second amount of time, or that is older than the first amount of time and is also infrequently accessed or has not been accessed by at least one user within the second amount of time.

12. The system as defined in claim 11, the system further comprising at least two geographically remote data stores that store at least a portion of the media.

13. The system as defined in claim 11, wherein the system includes copies of the voice content in a plurality of encoding formats.

14. The system as defined in claim 11, wherein the system stores in association with the first file a media identifier including a media source identifier.

15. The system as defined in claim 11, wherein the system includes search priorities stores in association with corresponding media data stores.

16. The system as defined in claim 15, wherein the program codes if further configured to:
   receive a media search query; and
   search the media data stores in an order based at least in part on the search priorities associated with the corresponding media data stores.

17. The system as defined in claim 11, wherein the system is configured to place the second data store in a spun down state to a greater degree than the first data store.

18. The system as defined in claim 11, wherein the first degree of compression is no compression.

19. The system as defined in claim 11, wherein the first file is in a first encoding format, wherein the program codes if further configured to cause the system to:
   receive a request for the media in a second format, the second format different than the first format; and
   transcode the first file into the second format.

20. A method of processing media received over a communications network, the method comprising:
   receiving, at a computing system including one or more computing devices, media over a network the media including voice content;
   storing the media in a first data store with a first degree of compression as a first file of a first size;
   enabling a user to search a transcription of the voice content;
   at least partly in response to:
   (i) a first period of time elapsing, or
   (ii) determining that the media has not been accessed or has been accessed at less than a first rate by at least one user, or
   (iii) the first period of time elapsing and determining that the media has not been accessed or has been accessed at less than the first rate by at least one user;
   determining by the computing system whether the media is to be stored with a second degree of compression as a second file of a second size, wherein
   the second degree of compression is higher than the first degree of compression, and wherein
   the second size is smaller than the first size and
   at least partly in response to the computing system determining that the media is to be stored with the second degree of compression, storing the media in a second data store as the second file of the second size,
      wherein the second data store is configured to primarily receive media older than a first amount of time, that is infrequently accessed or has not been accessed by at least one user within a second amount of time, or that is older than the first amount of time and is also infrequently accessed or has not been accessed by at least one user within the second amount of time.

21. The method as defined in claim 20, the method further comprising storing copies of the first file on a plurality of geographically separated drives.

22. The method as defined in claim 20, the method further comprising storing the media in a plurality of encoding formats.

23. The method as defined in claim 20, the method further comprising storing in association with the first file a media identifier including a media source identifier.

24. The method as defined in claim 20, the method further comprising storing search priorities in association with corresponding media data stores.

25. The method as defined in claim 24, the method further comprising:
   receiving a media search query; and
   searching the media data stores in an order based at least in part on the search priorities associated with the corresponding data stores.

26. The method as defined in claim 20, the method further comprising keeping the second data store in a spun down state to a greater degree than the first data store.

27. The method as defined in claim 20, wherein the first degree of compression is no compression.

28. The method as defined in claim 20, wherein the first file is in a first encoding format, the method further comprising:
   receiving a request for the media in a second format, the second format different than the first format; and
   transcoding the first file into the second format.

29. The method as defined in claim 20, wherein the media includes a Short Message Service text message, a fax, and/or a voice message.

30. The method as defined in claim 20, wherein the media includes an audio message or a recorded greeting.

* * * * *